US006265058B1

(12) United States Patent
Slenes et al.

(10) Patent No.: US 6,265,058 B1
(45) Date of Patent: Jul. 24, 2001

(54) POLYMER/PAPER CAPACITOR FILM

(75) Inventors: Kirk M. Slenes; Kristen J. Law; William F. Hartman, all of Albuquerque, NM (US)

(73) Assignee: TPL, Inc., Albuquerque, NM (US)

( * ) Notice: Subject to any disclaimer, the term of this patent is extended or adjusted under 35 U.S.C. 154(b) by 0 days.

(21) Appl. No.: 09/263,168

(22) Filed: Mar. 5, 1999

Related U.S. Application Data
(60) Provisional application No. 60/077,656, filed on Mar. 11, 1998.

(51) Int. Cl.[7] ................................ B32B 3/06; H01G 4/06
(52) U.S. Cl. .................................... 428/306.6; 428/304.4; 428/308.8; 428/309.9; 428/311.1; 428/317.1; 428/317.3; 428/319.3; 428/320.2; 428/327; 361/271; 361/306.3; 361/311; 361/312; 361/313; 361/314; 361/315
(58) Field of Search ............................ 428/306.6, 304.4, 428/308.8, 309.9, 311.1, 317.1, 317.3, 319.3, 320.2, 327; 361/271, 306.3, 311, 312, 313, 314, 315

(56) References Cited

U.S. PATENT DOCUMENTS

| | | |
|---|---|---|
| 2,557,928 | 6/1951 | Atkinson . |
| 3,649,892 | 3/1972 | Booe . |
| 3,671,484 * | 6/1972 | Cooper et al. ............... 260/33.6 SB |
| 3,851,363 | 12/1974 | Booe . |
| 3,900,416 | 8/1975 | Vincent . |
| 3,909,434 | 9/1975 | Brown . |
| 3,948,789 * | 4/1976 | Brooks ............................ 252/65 |
| 4,100,090 | 7/1978 | Brooks et al. . |
| 4,104,184 | 8/1978 | Brooks et al. . |
| 4,147,646 | 4/1979 | Cappo . |
| 4,535,382 | 8/1985 | Wada et al. . |
| 4,785,374 | 11/1988 | Nagai et al. . |
| 4,843,517 | 6/1989 | Maruyama et al. . |
| 5,103,371 | 4/1992 | Ogawa et al. . |
| 5,146,391 | 9/1992 | MacFarlane et al. . |
| 5,153,820 | 10/1992 | MacFarlane et al. . |
| 5,180,757 | 1/1993 | Lucey . |
| 5,187,639 | 2/1993 | Ogawa et al. . |
| 5,500,250 | 3/1996 | Ogawa et al. . |
| 5,516,983 | 5/1996 | Kishimoto et al. . |
| 5,580,265 | 12/1996 | Koblitz et al. . |
| 5,652,693 | 7/1997 | Chou et al. . |

\* cited by examiner

*Primary Examiner*—Mark Kopec
*Assistant Examiner*—Charles Boyer
(74) *Attorney, Agent, or Firm*—Rod D. Baker

(57) ABSTRACT

The present invention is a dielectric film, and method for making the film, suitable for use in the construction of capacitor devices, including wound capacitors. In order to overcome strength limitations associated with polymers having desirable dielectric properties, the invention includes a dielectric film featuring a polymer impregnated upon a strengthening substrate. The polymer is deposited directly upon the substrate, which substrate provides required physical strength for film processing and capacitor fabrication, without compromising dielectric performance.

The inventive film is based on siloxane polymers modified with polar pendant groups to provide a significant increase in dielectric constant and dielectric strength. During film production, the polymer infiltrates the porous paper to provide an interfacial composite layer between the two materials, the interfacial layer consisting of polymer and paper. The interfacial layer resulting from the film casting process unexpectedly and advantageously contributes to the film's electronic performance. Casting parameters, including drying and curing times and temperatures, are disclosed for a process by which the inventive film can be fabricated.

21 Claims, 3 Drawing Sheets

POLYMER/PAPER CAPACITOR FILM

CROSS-REFERENCE TO RELATED APPLICATIONS

This application claims the benefit of the filing of U.S. Provisional patent application Ser. No. 60/077,656, entitled "Polymer/Paper Capacitor Film," filed on Mar. 11, 1998, and the specification thereof is incorporated herein by reference.

BACKGROUND OF THE INVENTION

1. Field of the Invention (Technical Field)

The present invention relates to dielectric films, particularly dielectric films for use in wound capacitors, and specifically to a polymer-substrate film and method for making same.

2. Background Art

The development of high energy electrical storage systems with reduced size and weight are important for tactical and strategic pulsed power applications such as: electric armor, electric guns, particle beam accelerators, high power microwave sources and ballistic missile applications. In addition, commercially produced defibrillator systems have a significant need for higher energy density capacitors to achieve size and weight reductions. The dielectric energy storage density of pulsed power materials must be increased to provide feasibility or improve performance of these systems. The dielectric characteristics that represent a material's energy density are dielectric constant and operational electric field. Energy density is proportional to the dielectric constant and varies as the square of the electric field.

It is known to provide dielectric films incorporating polymers for use in capacitor production. However, with polymers having low physical strength, the full energy density potential cannot be realized because, at polymer thicknesses required for optimum performance (e.g. $\leq 8.0$ $\mu$m), the physical strength of a polymer film is insufficient for incorporation into a wound capacitor. At greater thicknesses, the polymer film's energy density reaches only a fraction of the polymer's potential due to the logarithmic decrease in dielectric strength associated with increasing polymer thickness. A need remains for a dielectric film featuring both optimal energy density as well as sufficient strength for incorporation, using conventional winding fabrication techniques, into capacitor devices. Against this background, the present invention was developed.

SUMMARY OF THE INVENTION (DISCLOSURE OF THE INVENTION

The invention is dielectric film apparatus and fabrication method. The dielectric film is usable in capacitors, and at least in part is characterized by a substrate having a thickness and porous surface, a siloxane polymer deposited upon the surface to define a polymer layer, and infiltrated into the pores of the surface to define an interfacial composite layer comprising substrate and polymer. The substrate preferably comprises paper, and most preferably is metallized Kraft paper. The interfacial layer comprises a thickness of up to or equaling approximately one-half the thickness of the substrate. The polymer layer preferably, but not critically, has a thickness from about 4.0 $\mu$m to about 6.0 $\mu$m, and the substrate having a thickness of about 6.5 $\mu$m, and the interfacial composite layer having a thickness of less than about 3.25 $\mu$m. The preferred polymer is a siloxane polymer. Triflouro- and cyano- polar pendant groups are attached to the siloxane polymer to provide the increased dielectric constant. Networking siloxane molecules (d-hydroxy functionalized short chain phenyl-methyl siloxanes) are combined to the base polymer to increase molecular weight and establish material integrity in film form.

The invention also includes a process for fabricating a dielectric film characterized by the steps of preparing a polymer solution comprising a siloxane polymer, depositing the polymer solution onto a substrate, permitting the polymer solution to infiltrate into the substrate, drying the polymer solution upon the substrate and curing the polymer solution upon the substrate. The step of depositing a polymer solution preferably comprises extruding the polymer solution through a die head and onto porous paper, and optionally may further comprise adjusting the die head gap to approximately 25 $\mu$m; placing an extrusion die head at a distance of about 51 $\mu$m from a casting surface; and providing a back pressure of about 6.9 kPa in the die head. The step of drying the polymer solution upon the substrate preferably comprises the step of placing the polymer solution and substrate in an evaporation oven at a temperature of between approximately 20° C. and approximately 100° C., and the step of placing the polymer solution and substrate in an evaporation oven may comprise allowing the polymer solution and substrate to dwell in the evaporation oven for from about 1 minute to about 10 minutes. Similarly, the step of curing the polymer solution upon the substrate comprises the step of placing the polymer solution and substrate in a curing oven at a temperature of between approximately 100° C. and approximately 200° C., while the step of placing the polymer solution and substrate in a curing oven may comprise allowing the polymer solution and substrate to dwell in the cure oven for from about 1 minute to about 10 minutes. The fabrication process preferably involves a extrusion of the polymer onto a moving substrate, and thus may comprise the further step of the moving the substrate beneath the die head at a rate between about 0.02 m per minute and about 0.9 m per minute.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
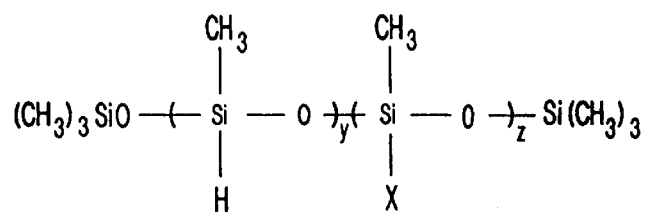
FIG. 1 is a diagram of the basic structure of the preferred high energy density polymer according to the present invention.

DESCRIPTION OF THE PREFERRED EMBODIMENTS (BEST MODES FOR CARRYING OUT THE INVENTION)

The present invention is a dielectric film, and method for making the film, suitable for use in the construction of capacitor devices, including wound capacitors. In order to overcome strength limitations associated with polymers having desirable dielectric properties, the invention includes a dielectric film featuring a polymer impregnated upon a strengthening substrate. The polymer is deposited directly upon the substrate, which substrate provides required physical strength for film processing and capacitor fabrication, without compromising dielectric performance.

The inventive film finds application in high energy density pulse power capacitors. This film is a composite formed from a polymer and, preferably from a high-density metallized paper, such as Kraft paper. The polymer has been custom formulated for high dielectric constant and strength with minimum dielectric losses. The composite can be wound and processed using conventional wound film capacitor manufacturing equipment. This new system has the potential to achieve 2 to 3 J/cm whole capacitor energy density at voltage levels above 3.0 kV.

In the preferred embodiment of the invention, an innovative continuous film production process permits a polymer to be cast directly upon, for example, metallized Kraft paper. The inventive film is based on siloxane polymers modified with polar pendant groups to provide a significant increase in dielectric constant and dielectric strength. During film production, the polymer infiltrates the porous paper to provide an interfacial composite layer between the two materials, the interfacial layer consisting of polymer and paper. The interfacial layer resulting from the film casting process unexpectedly and advantageously contributes to the film performance in at least two ways. First, the excellent physical bonding reduces the opportunity for delamination; also, the interfacial layer results in improved electronic properties of the film. Dielectric strength contribution of the paper substrate to the overall dielectric strength of the dual-layer structure is significantly greater when a high dielectric strength polymer is allowed to infiltrate the paper substrate.

The invention includes a film fabrication processes which allow for the polymer to be produced in a series configuration with the substrate. The inventive process maybe employed to continuously produce capacitor grade film for incorporation into wound capacitors at approximately 30 J. Measured performance of capacitors constructed with the inventive film support the potential for material energy densities greater than 2.0 J/cc.

The dielectric polymer film according to the invention is capable of an energy density of 7.5 J/cc. This represents a significant improvement in performance over known capacitor films. The inventive high energy density film is based on a siloxane polymer which is modified with polar pendant groups to provide a significant increase in dielectric constant and dielectric strength.

The energy density of the inventive polymer is limited by polymer thickness. At polymer thicknesses required for optimum performance (<8.0 um), the physical strength of the polymer is insufficient for incorporation into a wound capacitor. At greater thicknesses, the polymer's energy density reaches only a fraction of its potential due to the logarithmic decrease in dielectric strength associated with increasing thickness. Due to these strength constraints, the polymer of the invention is deposited directly onto a carrier substrate which provides the required physical strength for film processing and capacitor fabrication. Preferably, for continuous film production, the polymer is cast directly onto metallized Kraft paper to fabricate the dielectric film. Based on measured properties of the inventive polymer/paper film, it is expected that wound capacitors can be fabricated with energy densities in excess of 4.0 J/cc.

The high energy density polymer according to the invention is based on a siloxane backbone which is modified with two polar pendant groups to provide increased dielectric constant and dielectric strength. The preferred polymer is a siloxane polymer. Triflouro- and cyano- polar pendant groups are attached to the siloxane polymer to provide the increased dielectric constant. Networking siloxane molecules (d-hydroxy functionalized short chain phenyl-methyl siloxanes) are combined to the base polymer to increase molecular weight and establish material integrity in film form. FIG. 1 represents the basic molecular structure of the preferred polymer where X refers to the polar pendant groups. Networking siloxane molecules are combined to the base polymer to increase molecular weight and establish material integrity in film form. Conversion of the polymer resin to film relies on specific crosslinking reactions which are controlled through additional networking siloxane molecules and catalyst, such as a conventional platinum-based catalyst.

The base polymer and the crosslinked structure are tailored to allow for an optimum combination of physical and electrical properties. A crosslinked structure for the polymer is dependently established through specific crosslinking chemistries. The combination of polymer chemistry and crosslinking and catalyst chemistry allow for fabrication of a crosslinked polymer structure with good mechanical performance (strength, toughness and elasticity) and excellent electrical performance (dielectric constant, strength, loss and resistivity).

Synthesis capabilities are scaled in the invention to support continuous film fabrication. Polymer pendant groups are synthesized and purified on a 5.0 kg batch size. Pendant group additions and polymer synthesis are performed on a 1.0 kg level with capability for scaled synthesis of 20 kg. One kg of polymer allows for production of greater than 300 m of film.

Figure 2:
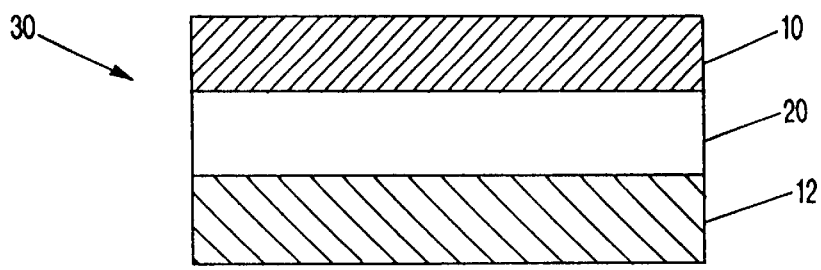
FIG. 2 is a side sectional diagram of the polymer/paper capacitor film according to the present invention.

In the inventive configuration, the paper acts as a carrier substrate to which the desirable polymer film is bonded. The preferred polymer is deposited from solution on the paper side of a single metallized Kraft paper. FIG. 2 is a schematic sectional view of a preferred embodiment of the polymer/paper composite film 30 according to the invention. The top or polymer layer 10 of the film 30 represents about 4.0 $\mu$m to about 6.0 $\mu$m thickness of the preferred polymer composition, while the bottom or substrate layer 12 represents approximately 6.5 $\mu$m thickness of substrate, preferably Kraft paper. In the preferred embodiment, the polymer 10 infiltrates the porous paper 12 to provide an interfacial composite layer 20, consisting of polymer and paper (the polymer occupying the interstitial spaces and pores of the substrate), between the polymer layer 10 and the substrate layer 12. The interfacial composite layer 20 has a thickness of up to about one-half the thickness of the substrate layer 12. The interfacial layer 20 resulting from the film casting process contributes to the film performance in two manners: excellent physical bonding of the two materials (no delamination) and improved electronic properties of the paper. The dielectric strength contribution of the paper to the two layer structure of the film 30 is significantly greater when the high dielectric strength polymer 10 is allowed to infiltrate the paper 12.

The continuously produced film of the invention includes the a layer of the polymer bonded to a strengthening substrate. The substrate preferably consists of approximately 6.5 $\mu$m metallized Kraft paper to which the polymer is applied. The preferred substrate, Kraft paper, is about 50% porous; the pores and non-uniformities in the surface of the paper are filled with polymer and a consistent polymer layer is deposited at an optimum thickness of approximately 4.0 $\mu$m. The polymer is permitted to penetrate into the pores, so that the polymer infiltrates into the paper substrate a distance of up to about half the paper's thickness. Thus, for a substrate of about 6.5 $\mu$m in thickness, the interfacial composite layer is less than or about equal to 3.25 $\mu$m.

In order to establish inherent film performance characteristics and reliability of dielectric strength, small area evaluations were performed. Table I lists general dielectric performance characteristics for the composite film 30.

TABLE 1

Material Performance of TPL Dielectric Film (Test Area = 1.0 in$^2$)

| | 120 Hz | | 1.0 kHz | | | |
|---|---|---|---|---|---|---|
| | Dk | Df | Dk | Df | BDS (kV/mil) | R ($\Omega$ – cm) |
| TPL Polymer/Paper | 9.3 | .03 | 8.6 | .06 | 9.5 ± 0.4 | $10^{14}$ |

The invention includes casting processes for continuous production of quality metallized dielectric film. The inventive polymer is deposited from solution onto the substrate carrier, which provides the film with the physical strength required for processing a capacitor fabrication. all film fabrication processes preferably are performed in a class 100 clean room environment to minimize contamination.

The invention includes the casting process which allows for continuous production of quality metallized dielectric film. The preferred polymer is deposited from solution onto a substrate carrier which provides the film with the physical strength required for processing and capacitor fabrication. All film fabrication processes preferably are performed in a class 10 clean room environment to minimize contamination.

Figure 3:
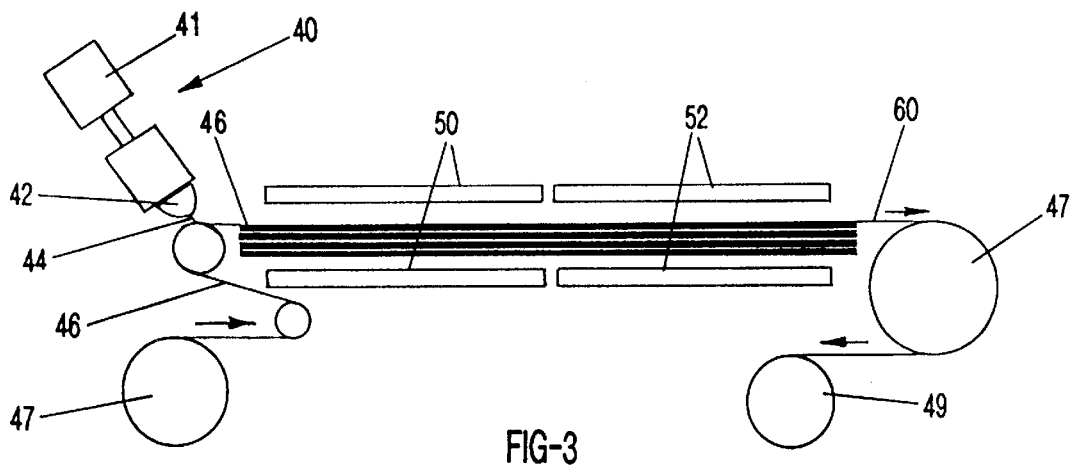
FIG. 3 is a schematic presentation of the casting apparatus used in the process of the present invention.

FIG. 3 represents a schematic of a film caster used in the process of the invention. The casting apparatus was designed and built using a combination of tape casting and extrusion principals. (It should be noted that the preferred polymer is a thermoset material and conventional film casting processes used in thermoplastic film fabrication are not applicable.) As with tape casting, the polymer is deposited in solution onto a moving carrier and is dried and set through an evaporation and heating process. Fabrication of the film is performed using an extrusion apparatus 40 consisting of a precision gear pump 41 and die head 42. Polymer solution 44 flows from a reservoir through a fixed gap in the die head 42 and is extruded onto the moving substrate 46. The substrate 46 with the polymer deposited thereon is pulled by conventional tractor devices 47. While the substrate 46 moves along, the polymer solution 44 is permitted to infiltrate into the substrate 46. The resulting film product 60 moves through a series of drying and curing zones, defined within evaporation oven 50 and curing oven 52, respectively, to allow for polymerization. The film 60 may finally spooled onto a core 49 compatible with standard capacitor winders.

Critical casting parameters have been determined to produce a consistent film with the desired cure. Film thickness and uniformity are controlled through solvent selection, polymer solution viscosity, film feed rate, solution back pressure, pump rate, and die head gap. Solvent evaporation and cure parameters are controlled through time/temperature profiles, dwell time in the ovens 50, 52, and air flow/exhaust during the cast. Current casting capabilities allow for continuous production of film up to 0.2 m wide at a thickness as low as 2.0 $\mu$m at a rate of approximately 0.3 m per minute.

In order to obtain a desired film thickness of 10 $\mu$m, for example, the polymer solution preferably is prepared to a viscosity of approximately 100 cPs by diluting the polymer to approximately 70 weight percent using a common organic solvent, methyl ethyl ketone. Other organic solvents may alternatively be employed, including other ketones as well as alcohols such as ethanol or methanol. The extrusion die head 42 preferably is placed at a distance of about 2 mils (51 $\mu$m) from the casting surface with the die head gap adjusted to approximately 1.0 mil (25 $\mu$m) to form a standing meniscus on the substrate 46 as the substrate moves beneath the die head 42. At a back pressure of about 6.9 kPa, the casting or substrate feed rate is between about 0.02 m per minute and about 0.9 m per minute, preferably approximately 0.1 m per minute. Evaporation of the solvent and subsequent cure of the polymer are controlled through temperature profiles during the cast.

In the preferred process of fabrication, the moving substrate 46 with polymer 44 deposited thereon moves through a pair of ovens 50, 52 arranged in series. The evaporation of the solvent occurs in the evaporation oven 50 while the film 60 moves through it. The evaporation oven 50 preferably is maintained at a temperature of between approximately 20° C. and about 100° C. The moving film 60 is allowed to dwell within the evaporation oven 50 for between about 1 minute and 10 minutes. The film 60 continues moving at the uniform rate into and through a curing oven 52 for curing the polymer 44. The curing oven 52 is maintained at a temperature of between approximately 100° C. and approximately 200° C., and the film 60 is allowed to dwell therein for between about 1 minute and about 10 minutes. The foregoing film casting processes may be adapted to industrial scale film production equipment to allow for a significant increase in film production rate.

Figure 4:
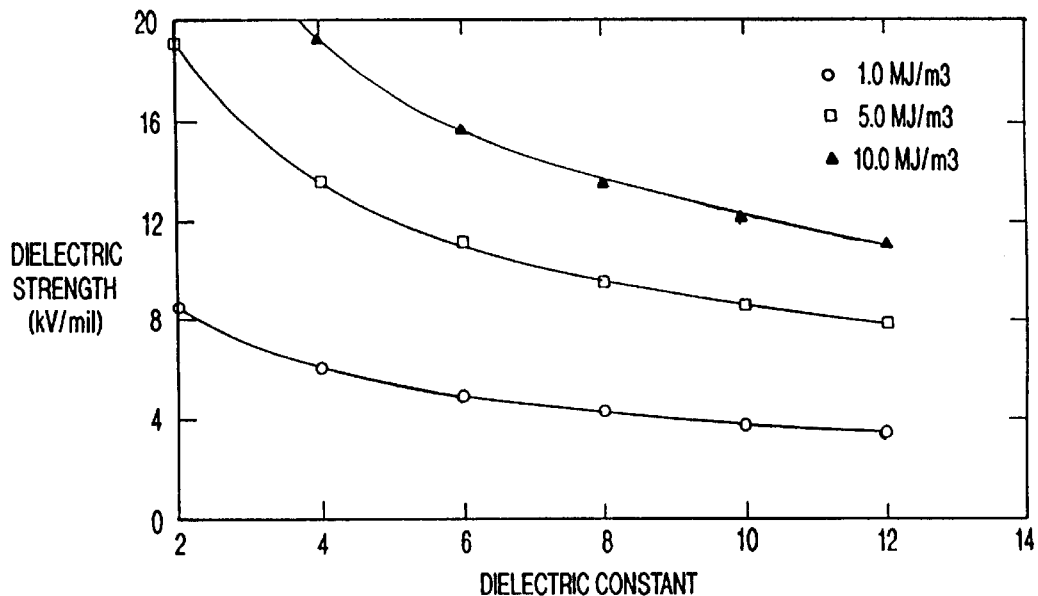
FIG. 4 is a graph showing material energy density dependence on dialectic constant and strength, plotting dialectic strength as a function of dielectric constant.

The invention thus advantageously offers a film with a dielectric constant and dielectric strength greater than conventional materials, while maintaining all other high performance parameters; resistivity, loss factor and discharge efficiency. The inventive film provides an energy density at breakdown voltage of greater than 5.0 J/cc. This performance represents a significant improvement over state-of-the-art materials. For example, polypropylene films commonly perform at 1.2 J/cc and PVDF at 2.2 J/cc (poor discharge efficiency). Table 2 shows a performance summary comparing the inventive polymer/paper film, polypropylene and PVDF, while FIG. 4 shows the general relationship between material dielectric constant, strength and energy density. Capacitor energy density values for the inventive polymer/paper film presented in Table 2 have been reduced 35% to account for scaling from small test areas to full device.

TABLE 2

Performance Comparison of Capacitor Materials

| Dielectric Type | Capacitor Design | Dielectric Constant | Capacitor Energy Density | Discharge Efficiency |
| --- | --- | --- | --- | --- |
| TPL Polymer + Paper Film | Polymer + Single Metallized Paper | 9.0 | 4.0 J/cc* | 95% |
| Polypropylene | Polymer + Single Metallized Paper | 2.2 | 1.2 J/cc | 98% |
| PVDF | Polymer + Double Metallized Paper | 7.5 | 2.2 J/cc | 75% |

*Performance based on scaling factor of 65% from small to large device.

Figure 5:
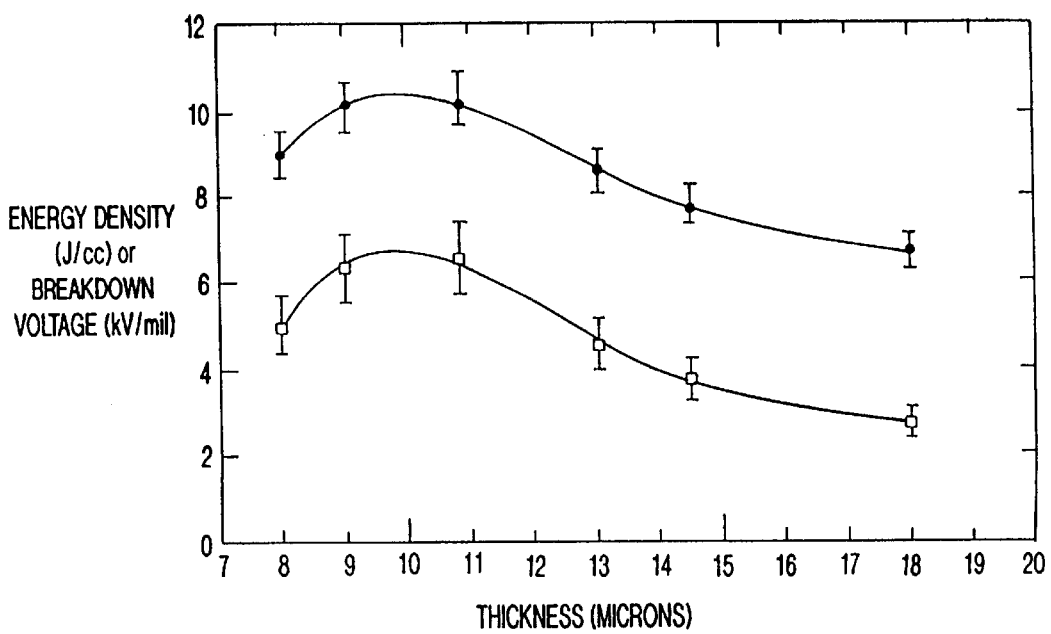
FIG. 5 is a graph showing dielectric strength of the film of the invention versus film thickness, for a 1 square-inch test area, plotting energy density as a function of film thickness.

The dielectric strength of the inventive film with respect to film thickness has been established. Referring to FIG. 5, maximum dielectric strength performance is obtained at a film thickness, substrate plus polymer, of approximately 10 $\mu$m. Above 10 $\mu$m, a decrease in dielectric strength, consistent with all dielectric polymers, is experienced. Below 10 $\mu$m, the decrease in dielectric strength can be attributed to domination of the film properties by the paper properties, e.g., increase in the paper component with a lower dielectric strength.

In addition to high energy density, the inventive film exhibits high efficiencies in energy storage and energy release. Bulk resistivity of the present film is approximately 10 ohm/cm, suggesting low leakage current in a capacitor application. Also, preliminary discharge characteristics show a performance comparable to high efficiency dielectric materials such as polypropylene and polyester with >95% efficiency.

Industrial Applicability

The invention is further illustrated by the following non-limiting example. To establish the performance of the film in a wound capacitor configuration, processes have been developed for capacitor fabrication to obtain a full range of performance characteristics of the film in a wound device. For this example, three specific capacitor fabrication objectives existed: (1) Produce high quality paper/polymer film according to the invention; (2) Determine the optimum dielectric fluid for the polymer/paper film; and (3) Fabricate model capacitors (10 $\mu$F and 3.0 kV) using the polymer/paper film.

A standard capacitor winding procedure and design was performed in order to establish the compatibility of the film with conventional processes. During the first set of windings it was determined to use common fabrication processes: winding onto an arbor with a few turns of thin paper as a soft core followed by pressing into an oval configuration under heat. This is an advantage since modifying winding equipment to accommodate a particular film can be difficult and expensive.

The dielectric paper selected for the film production was a single metallized Kraft. The paper was 7.0 $\mu$m in thickness by 100 mm in width at a density of 1.3 g/cc. The metallization was a special high-surface resistivity for maximum self-healing capability. Heavy metallization was applied to the paper edge to improve endspray connection for the terminals and maximized peak current capability. Rolls of the metallized Kraft coated with the polymer of the invention were produced for capacitor fabrication. Winding of the capacitors was performed on a slow, manually operated winding machine, which permitted readjustment of the supply rolls for compensation of shifting of the winding material.

Sections were wound using a ⅜-inch arbor with 3 turns of 5 mil thick starter Kraft paper. After the start of winding the section, the active dielectric length was measured using a length counter held against one of the supply rolls. Extending the outer metallized Kraft approximately two turns beyond the inner metallized Kraft finished off each section. Wound sections of the film were heat pressed and end-sprayed at each end. Small tabs were carefully soldered to the section endsprayed ends. The long tab end corresponds to the outer electrode of the section and is insulated and assembled into the bottom end of the can with Kraft packing.

Capacitors were packaged following winding and termination. Each capacitor winding was wrapped with insulation and Kraft packing, then inserted into an oversized steel can with terminals attached to the arc sprayed ends. The capacitors were then dried and impregnated with the dielectric fluid. Among the fluids established as suitable impregnants for the inventive film were castor oil, mineral oil and a high Dk siloxane. The drying and impregnation cycle is summarized as follows: (1) Initial heating from room temperature to >100° C.; (2) Long term dry vacuum at >100° C.; (3) Cool-down to impregnation temperature (<100° C.), then fill under vacuum; and (4) Long term warm oil soak under dried air, then cool down to room temperature.

Figure 6:
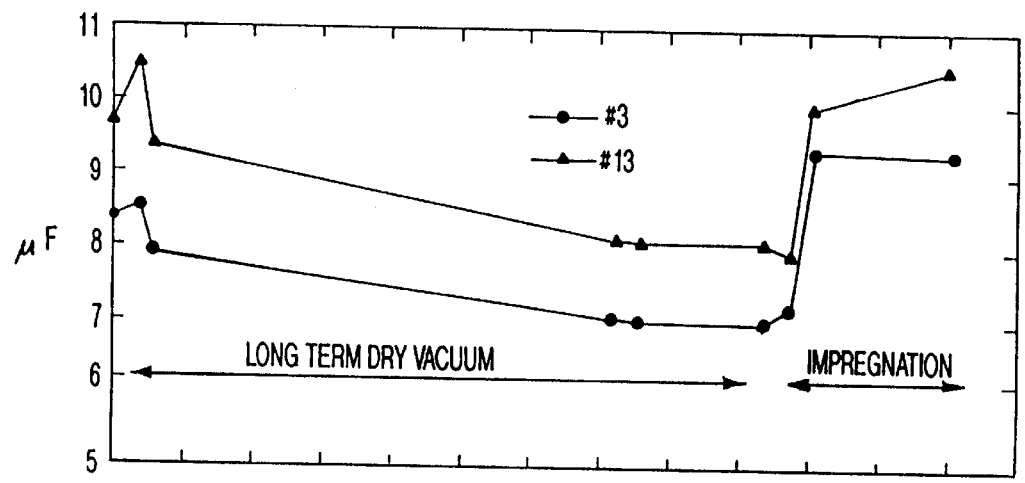
FIG. 6 is a graph showing capacitance (at 120 Hz) of a capacitor incorporating the inventive film during drying and impregnation of castor oil.
Figure 7:
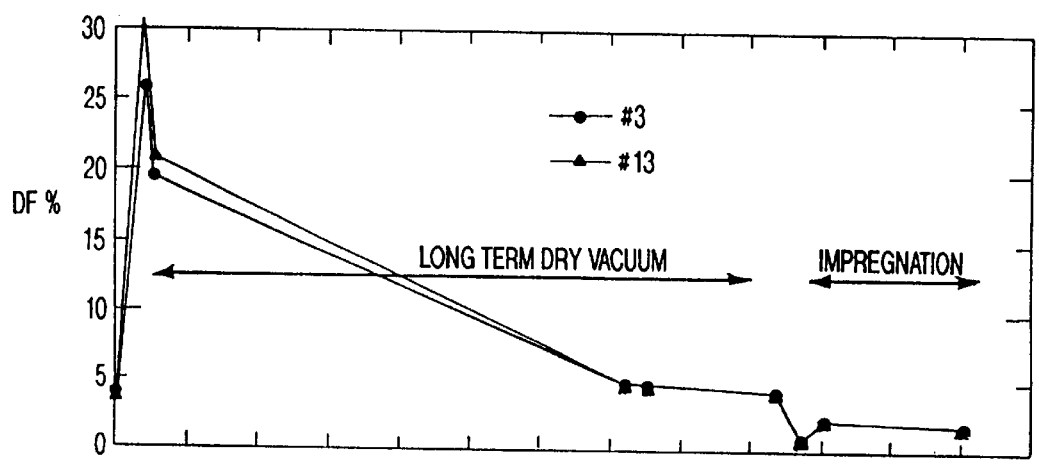
FIG. 7 is a graph showing dissipation factor (at 120 Hz) during drying and impregnation of castor oil in a capacitor incorporating the film of the present invention.

The initial heating of the dry capacitors produces an initial spike in both DF and capacitance, due to heating of moisture in the dielectric. The capacitance drops by more than 15% during the vacuum drying process and the DF drops considerably as well while the water is removed during the vacuum drying process. The capacitance increases by approximately 20% from impregnation with castor oil starting from the fully dried state during the cycle. The trend of capacitance and DF during the drying and impregnation process has been monitored via wire feedthroughs for some of the capacitors, and typical results are shown in FIGS. 6 and 7.

Electrical evaluations were made on capacitor windings impregnated with mineral and castor oil. Approximately 30 m of polymer coated 1.3 density paper was used for each device. All devices were tested with regard to capacitance, dissipation, leakage current and voltage hold-off The evaluations performed on the wound capacitors produced using the inventive film showed encouraging performance. Capacitor voltages between 3.2 kV and 4.1 kV were achieved on the 11.0 $\mu$m polymer/paper film corresponding to a dielectric strength between 7.4 kV/mil and 9.5 kV/mil. The capacitors also demonstrated excellent self-healing characteristics. Maximum voltage was maintained and the film was able to survive several film failures without shorting. In regard to capacitance, measured values were between 6.0 $\mu$F and 10 $\mu$F, approximately 20% lower than theoretical. The low measured capacitance is believed to be associated with the relatively low tension and loose windings associated with use of a manual winding machine. (This is a problem which can be overcome with the use of more advanced winders.) In regard to dissipation factor, measured values were marginally higher than the intrinsic material dissipation factor of 3.0% at 120 Hz and 6.0% at 1.0 kHz. Loss factors on the capacitors were approximately 4.0% at 120 Hz and 7.0% at 1.0 KHz. It is believed that additional loss is associated with minor damage to the electrodes during casting. It is anticipated that this problem can be overcome with only minor modifications to the casting setup. Finally, leakage current on the 10 μF capacitors was measured to be 10 μA at 1.0 kV and 100 μA at 2.0 kV. Loss of charge in application due to leakage is not expected to be a capacitor limitation.

Capacitor efficiency testing consists of two methods. The first method monitors charge supplied to the capacitor while the second method monitors discharge from the capacitor. A Spellman constant current power supply is used for charging the device under test and a Techtronix TDS 420 digitizing oscilloscope controlled by a PC is used to monitor voltage and current as a function of time. Capacitor performance under charging is determined with the aid of know software routines. Stored energy, capacitance as a function of time and capacitance as a function of voltage are monitored. Capacitor performance under discharging is determined with the aid of computer processing. A custom discharge testing apparatus used a low inductance system which has a resistive load to absorb the discharged energy stored in the test capacitor, a CVR to monitor the discharge of the capacitor through the resistive load. The software records and graphs the capacitor's voltage, the load current, and the voltage across the load as a function of time. From this data, three plots are generated: load resistance, load power output, and total load energy dissipated as a function of time. Capacitor efficiency is then defined as the ratio of energy released during discharge to the input energy.

Evaluations of capacitors produced using the inventive film were made relative to metallized polypropylene capacitors. Charge and discharge characteristics were measured on both sets of devices to determine the efficiency of capacitors incorporating the inventive film relative to a polypropylene standard. In order to establish the desired discharge time of approximately 2.0 msec, a low inductance resistive load of 500 π was selected. Table 3 summarizes the capacitor discharge efficiencies for capacitors produced with polypropylene and the inventive polymer/paper film. Notably, the efficiency of the inventive film is far superior to that of other high dielectric constant polymer. For example, polyvinylidene fluoride films exhibit a discharge efficiency less than 70% due to long dipole relaxation times.

Accordingly, the inventive dielectric film is compatible with conventional capacitor fabrication processes. The film incorporates a unique material design consisting of Kraft paper and a polymer which possesses a high dielectric constant and high dielectric strength. When constructed in a wound capacitor configuration, this composite film has the potential to achieve 2 to 3 Vcm whole capacitor energy density at voltage levels above 3.0 kV.

TABLE 3

Capacitor Discharge Efficiencies

| | Input Energy (J) | Discharged Energy (J) | Efficiency Rating |
|---|---|---|---|
| Metallized Polypropylene (Test Standard) | 20.0 | 20.0 | 100% |
| TPL Polymer/Paper | 21.9 | 20.5 | 93.6% |

Results obtained support the ability to fabricate rolls of capacitor grade film and to incorporate the film into wound capacitors. Preliminary test results demonstrate the model capacitors ability to provide a high energy density at a relatively high efficiency. The first iteration of capacitors show a discharge efficiency of 93.6A% on capacitors with energy densities of approximately 2.0 I/cm.

It is expected that further development of this film technology into capacitors will have significant application in government and commercial pulsed power systems. Reduced size and weight are important for tactical and strategic applications such as: electric armor, electric guns, particle beam accelerators, high power microwave sources and ballistic missile applications. In addition, commercially produced defibrillator systems requiring size and weight reductions have a significant need for higher energy density capacitors.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of any and all references, applications, patents, and publications cited above, and of the corresponding provisional application are hereby incorporated by reference.

What is claimed is:

1. A dielectric film for use in capacitors, characterized by:
   a substrate having a thickness and a porous surface; and
   a siloxane polymer deposited upon said surface to define a polymer layer, and infiltrated into the pores of said surface to define an interfacial composite layer comprising substrate and polymer;
   wherein said film comprises a total thickness of less than about 12.5 μm.

2. A dielectric film according to claim 1 characterized by said interfacial layer comprises a thickness approximately one-half the thickness of said substrate.

3. A dielectric film according to claim 1 characterized by said polymer layer having a thickness from about 4.0 μm to about 6.0 μm, and said substrate having a thickness of about 6.5 μm, and said interfacial composite layer having a thickness of less than about 3.25 μm.

4. A dielectric film according to claim 1 wherein said dielectric film manifests an energy density of at least 5.0 J/cc.

5. A dielectric film according to claim 4 wherein said dielectric film manifests an energy density of at least 7.5 J/cc.

6. A dielectric film according to claim 4 wherein said dielectric film manifests an energy density of between about 5.0 J/cc and about 7.5 J/cc.

7. A dielectric film for use in capacitors, characterized by:
   a substrate having a thickness a and porous surface; and
   a siloxane polymer deposited upon said surface to define a polymer layer comprising a thickness of less than about 6.0 μm, and said polymer infiltrated into the pores of said surface to define an interfacial composite layer comprising substrate and polymer; wherein said film comprises a total thickness of less than about 12.5 μm.

8. A dielectric film according to claim 7 whereon said polymer layer comprises a thickness of between about 4.0 μm and about 6.0 μm.

9. A dielectric film according to claim 7 wherein said polymer layer comprises a thickness of approximately 4.0 μm.

10. A dielectric film according to claim 7 wherein said interfacial composite layer comprises a thickness of less than approximately 3.25 μm.

11. A dielectric film according to claim 7 wherein said film comprises a total thickness of up to and including approximately 10.0 μm.

12. A dielectric film according to claim 7 wherein said film comprises a total thickness of approximately 10.0 μm.

13. A dielectric film for use in capacitors, characterized by:

a substrate having a thickness a and porous surface; and a siloxane polymer deposited upon said surface to define a polymer layer having a thickness of less than approximately 6.0 μm, and said polymer infiltrated into the pores of said surface to define an interfacial composite layer comprising substrate and polymer, said interfacial composite layer comprising a thickness less than approximately one-half the thickness of said substrate;

wherein said film comprises a total thickness of less than about 12.5 μm.

14. A dielectric film according to claim 13 wherein said polymer layer comprises a thickness of between about 4.0 μm and about 6.0 μm.

15. A dielectric film according to claim 14 wherein said polymer layer comprises a thickness of approximately 4.0 μm.

16. A dielectric film according to claim 14 wherein said interfacial composite layer comprises a thickness of less than approximately 3.25 μm.

17. A dielectric film according to claim 16 wherein said film comprises a total thickness of up to and including approximately 10.0 μm.

18. A dielectric film according to claim 17 wherein said film comprises a total thickness of approximately 10.0 μm.

19. A dielectric film according to claim 17 wherein said dielectric film manifests an energy density of at least 5.0 J/cc.

20. A dielectric film according to claim 19 wherein said dielectric film manifests an energy density of at least 7.5 J/cc.

21. A dielectric film according to claim 19 wherein said dielectric film manifests an energy density of between about 5.0 J/cc and about 7.5 J/cc.

* * * * *

UNITED STATES PATENT AND TRADEMARK OFFICE
CERTIFICATE OF CORRECTION

PATENT NO. : 6,265,058 B1
DATED : July 24, 2001
INVENTOR(S) : Kirk M. Slenes et al.

It is certified that error appears in the above-identified patent and that said Letters Patent is hereby corrected as shown below:

Column 1,
Line 9, after the "CROSS-REFERENCE TO RELATED APPLICATION" and before the "BACKGROUND OF THE INVENTION" insert:

-- GOVERNMENT RIGHTS
The U.S. Government has a paid-up license in this invention and the right in limited circumstances to require the patent owner to license others on reasonable terms as provided for by terms of Contract No. DASG60-00-C-0017 awarded by the Ballistic Missile Defense Organization. --

Signed and Sealed this

Twenty-fourth Day of February, 2004

JON W. DUDAS
*Acting Director of the United States Patent and Trademark Office*